United States Patent [19]
Dean

[11] Patent Number: 6,120,118
[45] Date of Patent: Sep. 19, 2000

[54] COMPUTER ENCLOSURE AND METHOD OF MAKING SAME

[75] Inventor: Ronald P Dean, Fort Collins, Colo.

[73] Assignee: Hewlett Packard Company, Palo Alto, Calif.

[21] Appl. No.: 09/302,674

[22] Filed: Apr. 30, 1999

[51] Int. Cl.[7] .................................................. A47B 81/06
[52] U.S. Cl. ...................... 312/223.2; 361/829; 361/730
[58] Field of Search .................................... 361/683, 753, 361/756, 730, 731, 732, 829; 312/223.1, 263, 265.4, 265.5, 265.6, 265.1, 223.2

[56] References Cited

U.S. PATENT DOCUMENTS

| | | | |
|---|---|---|---|
| 3,470,420 | 9/1969 | Marks | 361/756 |
| 4,296,982 | 10/1981 | Kullander | 312/363 |
| 5,808,871 | 9/1998 | Rosecan et al. | 361/730 |
| 5,944,398 | 8/1999 | Wu | 312/223.2 |
| 5,991,164 | 11/1999 | Saito et al. | 361/753 |

FOREIGN PATENT DOCUMENTS

| | | | |
|---|---|---|---|
| 353202 | 1/1990 | European Pat. Off. | 361/730 |
| 4013379 | 7/1991 | Germany | 361/829 |

OTHER PUBLICATIONS

TOX System, Tox Metal Fastening Systems Joined to the Future, (http://WWW.Toxsystems.com.au) no date.

*Primary Examiner*—Peter M. Cuomo
*Assistant Examiner*—Jerry A. Anderson
*Attorney, Agent, or Firm*—Kevin M. Hart

[57] ABSTRACT

Integral hem rivets fasten a front end panel, a back end panel and internal structural support members to a main sheet metal panel of a computer enclosure. The main sheet metal panel forms a cosmetic surface for the computer enclosure. The integral hem rivets used to fasten pieces to the main sheet metal panel do not blemish the cosmetic surface. In addition, the configuration of the hem conserves volume within the enclosure for mounting internal system components.

9 Claims, 9 Drawing Sheets

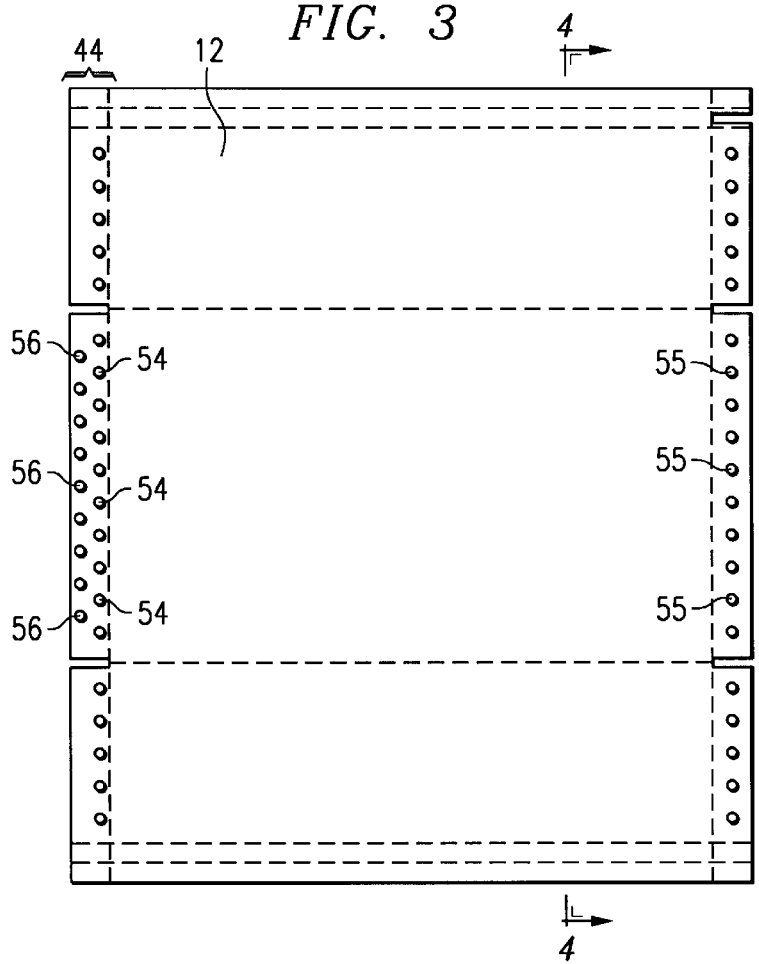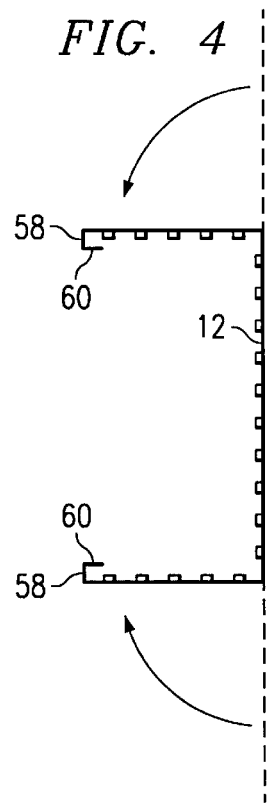

COMPUTER ENCLOSURE AND METHOD OF MAKING SAME

FIELD OF THE INVENTION

This invention relates to computer enclosures, and more particularly to a sheet metal fastening technique for constructing computer enclosures free of fastener-related blemishes and holes when viewed from the outside.

BACKGROUND

Personal computers, workstations, servers and the like usually take the form of a single system unit having access areas in one or more sides for switches, storage media and network, peripheral or power connectors. While it is common to fabricate system unit enclosures from sheet metal, design aspects of such enclosures vary widely due to competing constraints imposed by various goals.

One goal of computer enclosure design is to minimize the volume occupied by the system unit while conserving space inside the enclosure for internal system components. Another goal is to provide ample structural support and fastening surfaces for internal system components. Another goal is for the enclosure to prevent electromagnetic energy from escaping from the system unit and causing electromagnetic interference ("EMI") with other systems or devices. Yet another goal is to prevent fluid from escaping the system unit enclosure in the unlikely event of a component failure that involves melting or leakage. (One of the certification tests performed by United Laboratories, Inc. on computer system units is to pour flaming oil into the enclosure and determine whether the enclosure is able to contain the oil within the volume of the system unit. To be commercially successful, an enclosure design must be able to pass this United Laboratories "flaming oil" test.)

Additionally, a good design should be aesthetically pleasing. In this regard, it is usually considered desirable for a system unit to appear free of fasteners and fastener-related blemishes when viewed from the outside. To accomplish this look, prior art system unit enclosures have been fitted with metal or plastic outer covers, the purpose of which is entirely cosmetic—to hide enclosure fasteners such as rivets, welds and screws. But such a solution adds to the weight, expense and complexity of the enclosure. Another prior art solution to this problem has been to use spot welding on the inside of the enclosure. Even spot welds, however, are slightly visible when viewed from the outer side of the sheet metal. While it is possible to diminish the visibility of spot welds if thicker sheet metal is used for the enclosure, thicker sheet metal adds undesirable weight and cost to the system unit. A technique known as TOX riveting has also been used to construct computer enclosures. (TOX is a trademark of TOX Systems, Pty. Ltd., Melbourne, Australia.) But TOX riveting, by design, leaves a notable indentation on one side of the riveted pieces and a raised bump on the other side.

It is therefore an object of the invention to provide a computer enclosure that is free of fastener-related blemishes when viewed from the outside.

It is a further object of the invention to avoid adding weight or cost to the enclosure relative to the weight and cost of the enclosures of the prior art.

It is a further object of the invention to conserve volume that may be used for mounting internal system components.

It is a further object of the invention to provide ample structural support and mounting surfaces for internal system components.

It is yet a further object of the invention to achieve all of the above objectives in a manner that is consistent with ease of manufacturing.

SUMMARY OF THE INVENTION

In an embodiment, a novel integral hem riveting technique is used to fasten a front end panel, a back end panel and internal structural support members to a main sheet metal panel of a computer enclosure. The main sheet metal panel forms a cosmetic surface for the computer enclosure; but the integral hem riveting technique used to fasten pieces to the main sheet metal panel does not blemish the cosmetic surface. In addition, the integral hem riveting technique enables relatively thin material to be used for the outer panel, while still avoiding blemishes on the outer panel, thus saving weight and cost. The configuration of the integral hem rivets conserves volume within the enclosure because the hem is substantially coplanar with the sheet metal panel. Moreover, the novel technique use to create the integral hem rivets lends itself to ease in manufacturing, because the sheet metal panel may be laid flat against a support while the integral hem rivets are swaged.

BRIEF DESCRIPTION OF THE DRAWINGS

FIG. 3 is a plan view of the unfolded main enclosure panel of FIG. 1.

FIG. 4 is a sectional side view of the folded main enclosure panel of FIG. 1.

DETAILED DESCRIPTION OF THE PREFERRED EMBODIMENTS

Figure 1:
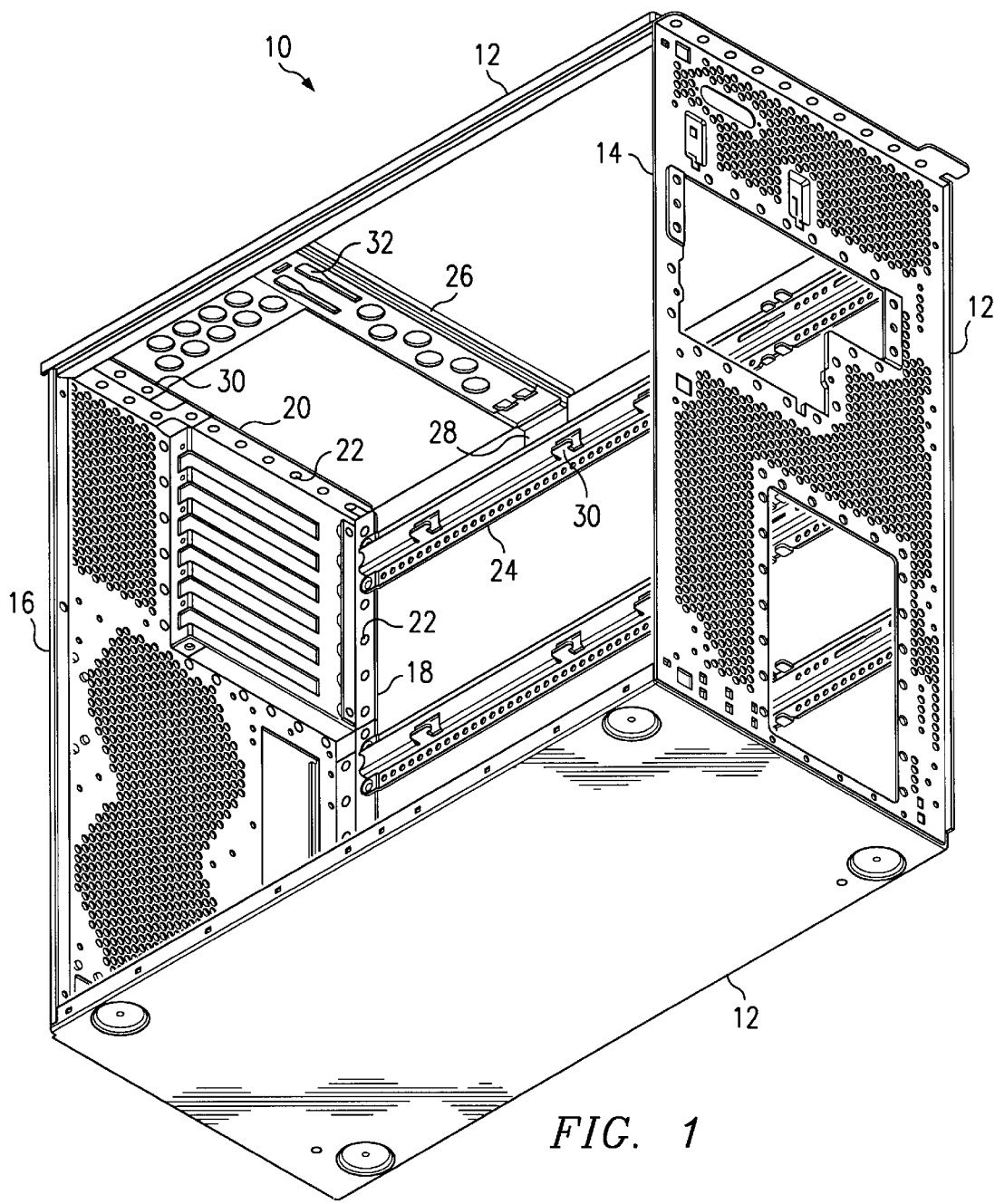
FIG. 1 is an oblique view of a computer enclosure constructed according to a preferred embodiment of the invention.

FIG. 1 illustrates a computer enclosure 10 constructed according to a preferred embodiment of the invention. A sheet metal panel 12 forms the top, bottom and one side the enclosure. The side not shown may be formed with a second sheet metal panel. Enclosure 10 also includes a metal front end panel 14 and a metal back end panel 16. In the embodiment shown, the top of the enclosure and the side formed by sheet metal panel 12 are cosmetic sides. They form outer visible surfaces that need not be covered by a cosmetic bezel. In the embodiment shown, all parts were constructed from cold rolled steel, although it is believed that other materials may be used with similar effect.

Formed along the back edge of the side of panel 12 is a first folded hem 18. Formed along the back edge of the top of panel 12 is a second folded hem 20. The plane of folded hem 18 is substantially parallel with the plane of the side of panel 12. The plane of folded hem 20 is substantially parallel with the plane of the top of panel 12. Both hems face the inside of the enclosure. Rivets 22 are integrally formed along hems 18 and 20, and are used to fasten numerous different pieces to panel 12. Back end panel 16 is fastened to panel 12 along the side, top and bottom. Longitudinal struts 24 are fastened to panel 12 at hem 18. One end of bracket 26 is fastened to panel 12 at hem 20. The other end of bracket 26 is fastened to longitudinal strut 24 with conventional fasteners as shown at 28.

Longitudinal struts 24 and bracket 26 serve as structural support members for mounting internal system components in enclosure 10. Longitudinal struts 24 have hooks 30 formed integrally thereon for engaging a system board mounting tray. In the embodiment shown, the system board would be oriented parallel with the side of enclosure 10. Input/output boards would be connected orthogonally into the system board, and would require card guides extending down into enclosure 10 to support them. Thus, bracket 26 have slots 32 formed therein for engaging a card guide for supporting the input/output boards.

Figure 2A:
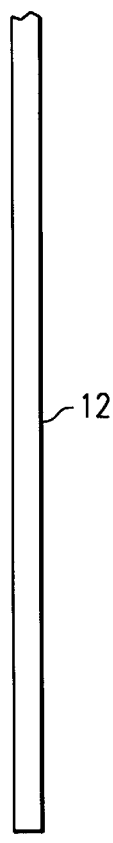
FIGS. 2A–F are sectional views illustrating a method for fastening a piece to an enclosure panel according to a preferred embodiment of the invention.
Figure 2B:
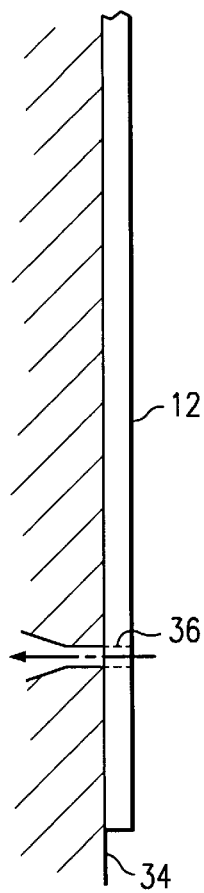
Figure 2C:
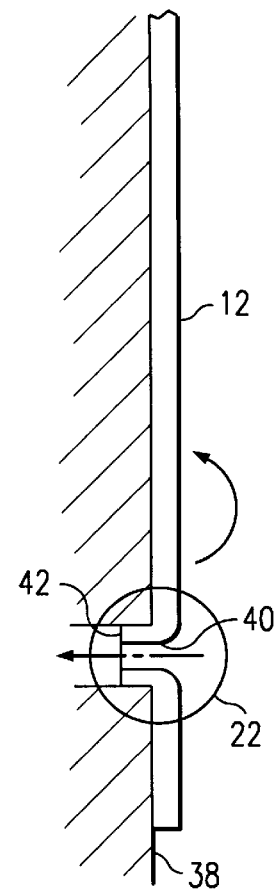
Figure 2D:
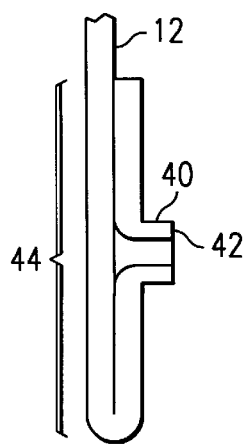

FIGS. 2A–F are sectional views illustrating a preferred method for fastening front end panel 14, back end panel 16, longitudinal struts 24 and bracket 26 to panel 12. At the beginning of construction, sheet metal panel 12 is preferably flat, as shown in FIG. 2A. It is laid against a punching die 34, and a pilot hole 36 is punched therein as shown in FIG. 2B. Then, as shown in FIG. 2C, panel 12 is laid against an extruding die 38, and pilot hole 36 is extruded to form an integral rivet 22 having a longitudinal portion 40 and a swaging end 42. As shown in FIG. 2D, the edge of panel 12 is folded 180 degrees onto itself, forming a hem 44.

Figure 2E:
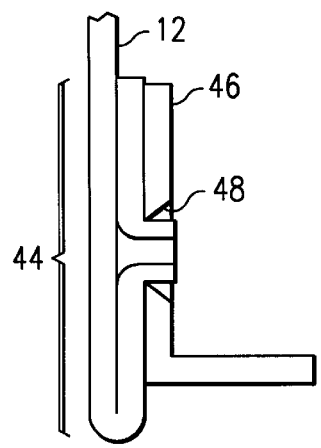
Figure 2F:
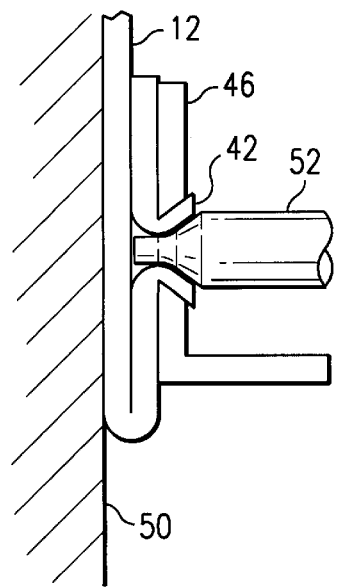

Piece 46 has a countersunk clearance hole 48 formed therein. As shown in FIG. 2E, clearance hole 48 is fitted around rivet 22 as piece 46 is brought into engagement with the folded portion of hem 44. Finally, as shown in FIG. 2F, the assembly is laid against a support 50, and a swaging tool 52 is used to swage end 42 outward so that it holds piece 46 in place against the folded portion of hem 44.

FIG. 3 is a plan view of panel 12 before it is folded. Note that multiple rows of rivets may be formed as shown at 54 and 56 before hem 44 is folded. In this manner, row 54 may be used for fastening back end panel 16 to panel 12, while row 56 may be used to fasten internal structural support members such as struts 24 and bracket 26 to panel 12. FIG. 4 is provided to show how panel 12 looks edge-on after folding. Surfaces 58 and 60 are formed with additional folds of panel 12, and are preferably used to engage an additional side panel and an EMI gasket.

Figure 5:
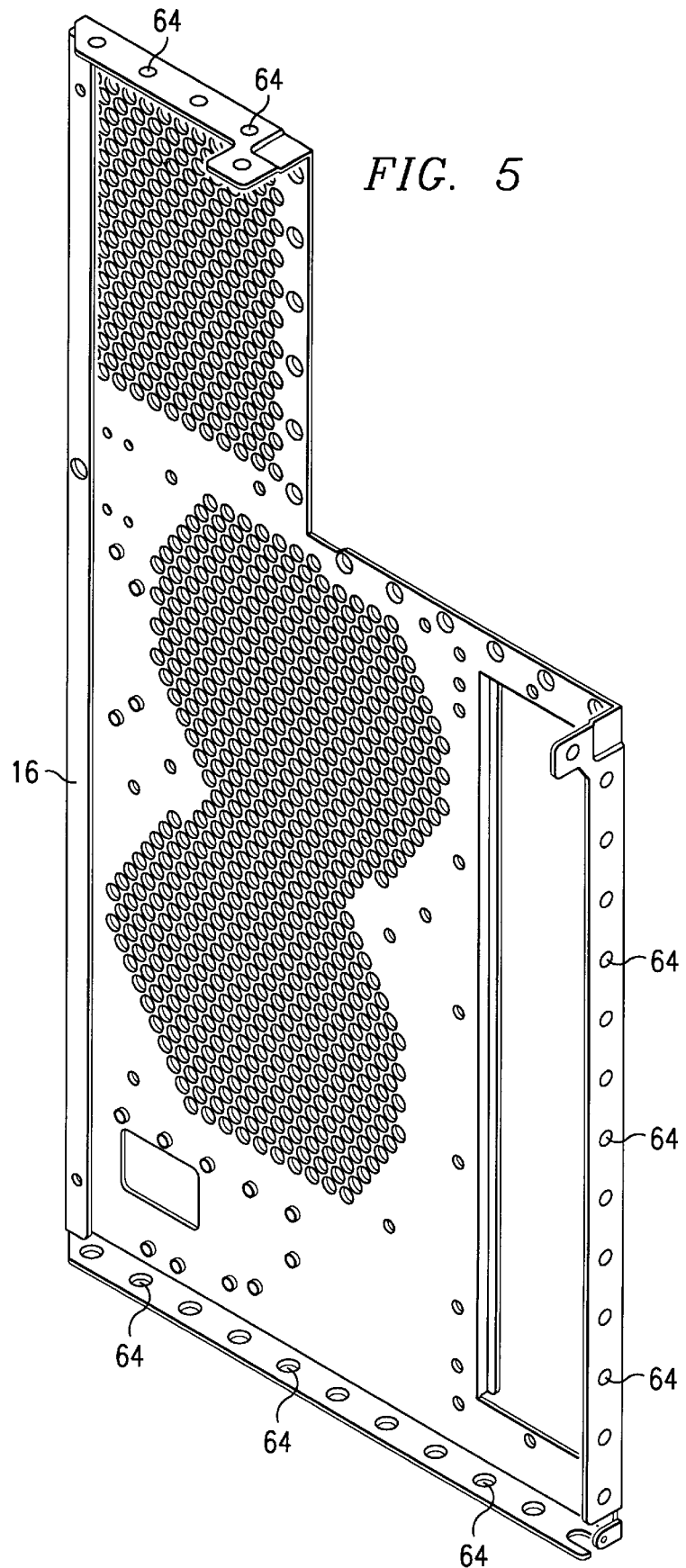
FIG. 5 is an oblique view of the back end enclosure panel of FIG. 1.
Figure 6:
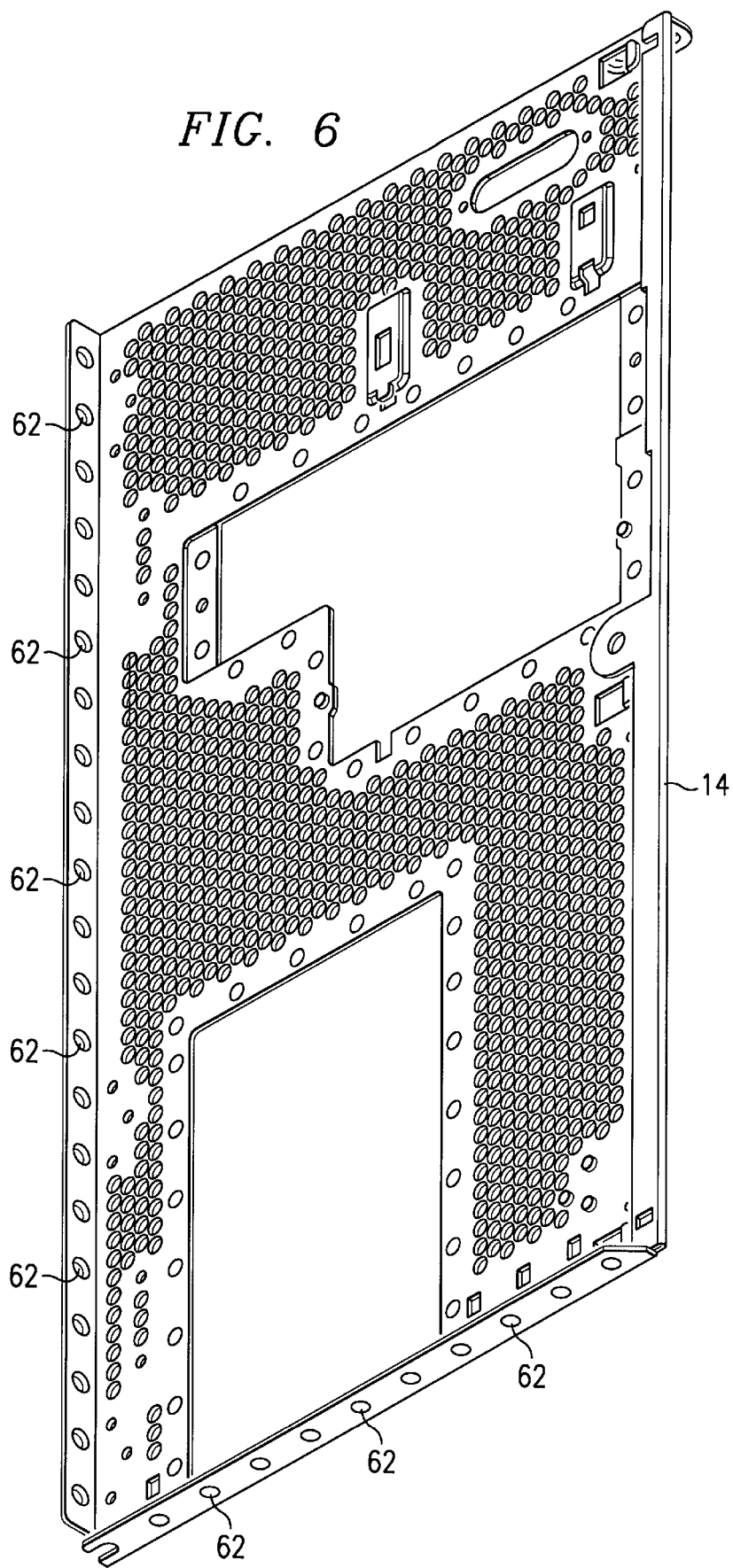
FIG. 6 is an oblique view of the front end enclosure panel of FIG. 1.

As can be seen in FIGS. 5 and 6, clearance holes 64 are formed in back end panel 16, and clearance holes 62 are formed in front end panel 14 for engaging rivets 22.

Figure 7:
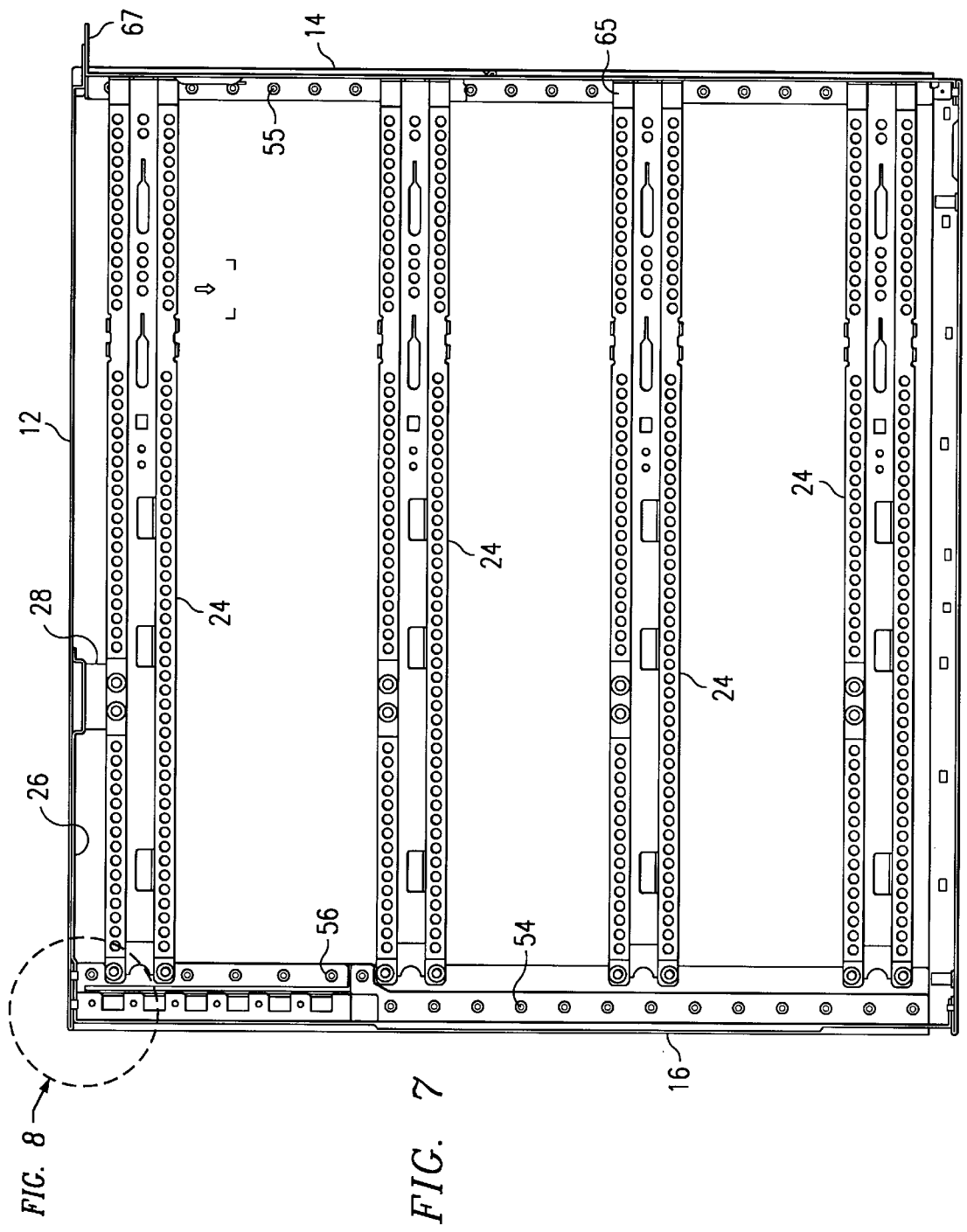
FIG. 7 is a sectional side view of the computer enclosure of FIG. 1.

FIG. 7 is a sectional side view of enclosure 10 showing back end panel 16, front end panel 14, struts 24 and bracket 26 fastened to panel 12. Front end panel 14 is fastened using rivet row 55. Back end panel 16 is fastened using rivet row 54. And struts 24 are fastened using rivet row 56. Note that front ends 65 of struts 24 may either be fastened to panel 12 using integral hem rivets, or they may be fastened to front panel 14 (as shown) using conventional fasteners. Conventional fasteners were used on the front ends 65 of struts 24 in the embodiment shown because a cosmetic bezel was to be mounted to front end panel 14 at lip 67. In embodiments wherein a cosmetic front bezel is not desired, integral hem rivets should be used to fasten front ends 65 of struts 24 to panel 12.

Figure 8:
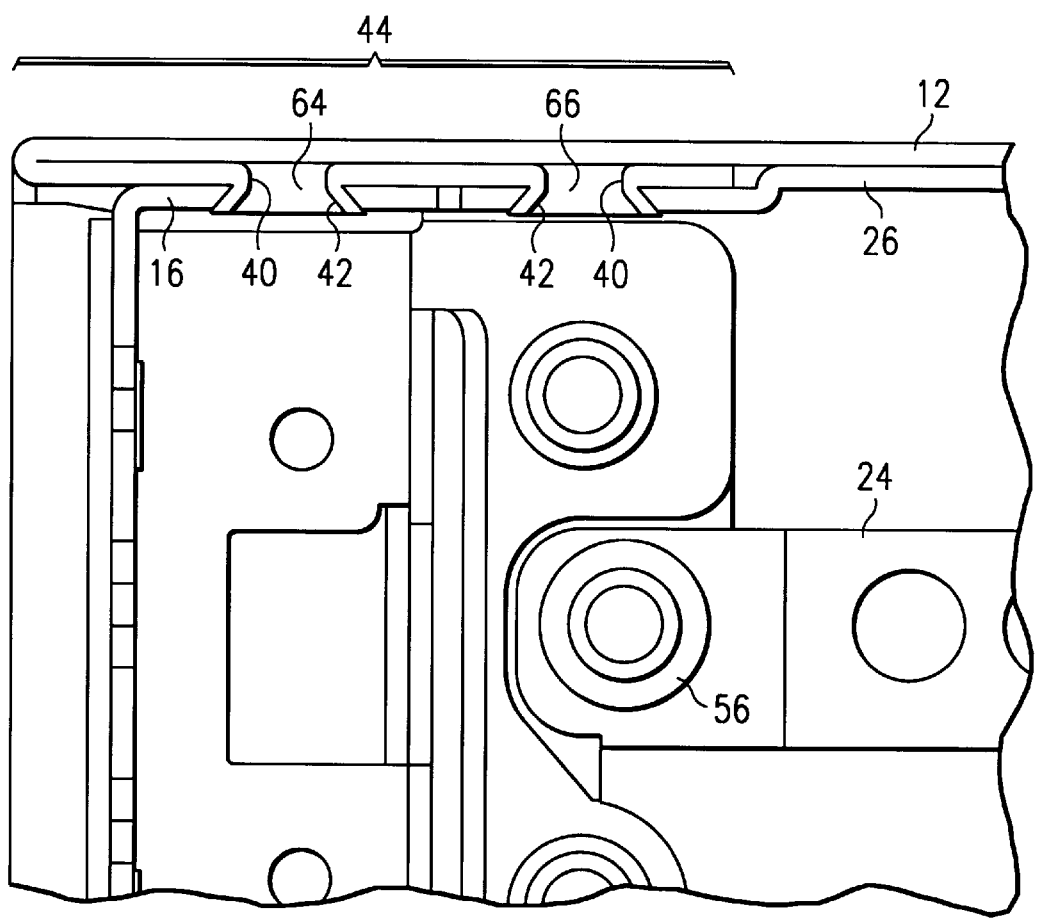
FIG. 8 is an enlarged view of the area circled in FIG. 7.
Figure 9:
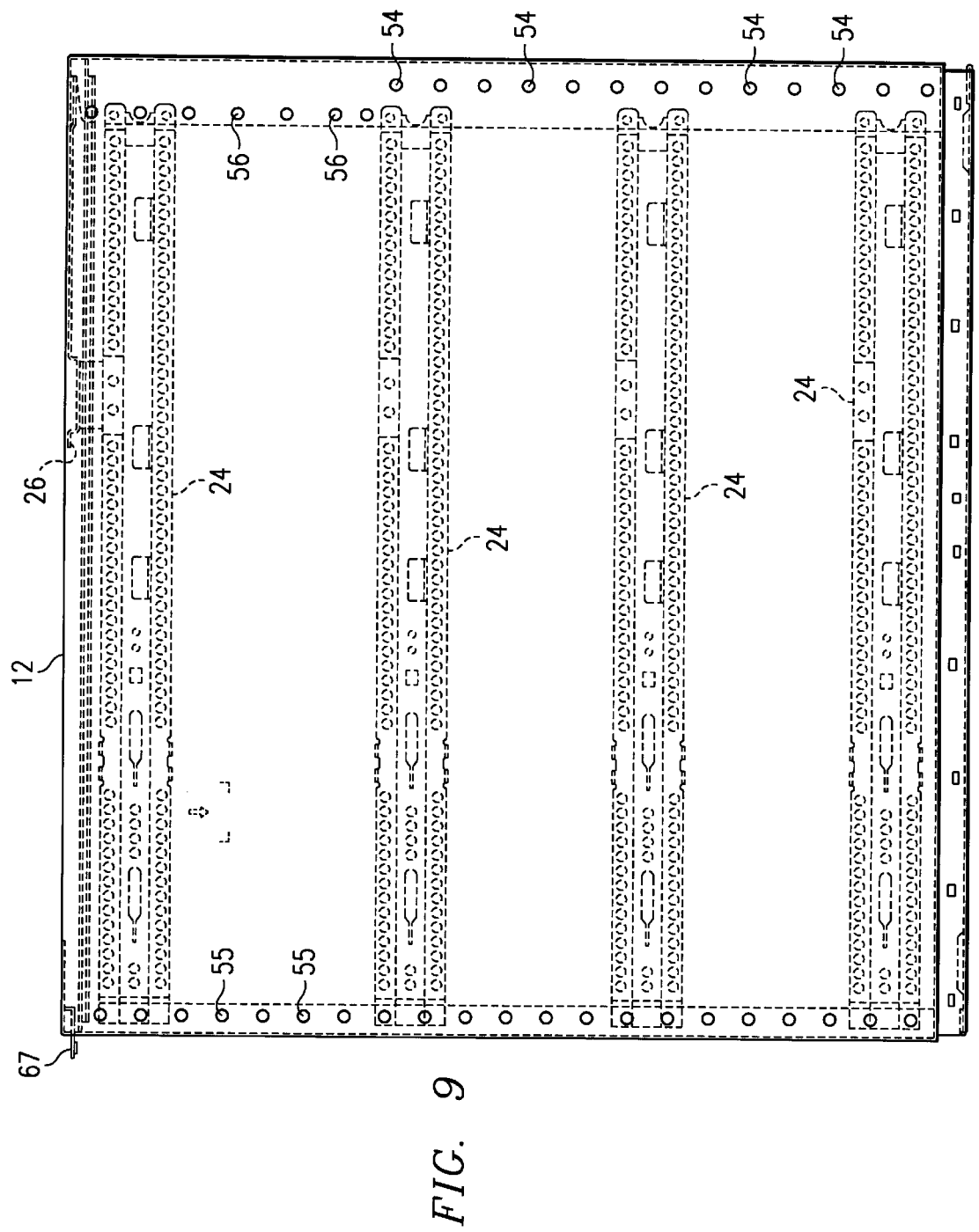
FIG. 9 is a side view of the computer enclosure of FIG. 1 showing internal structural support members with hidden lines.
Figure 10:
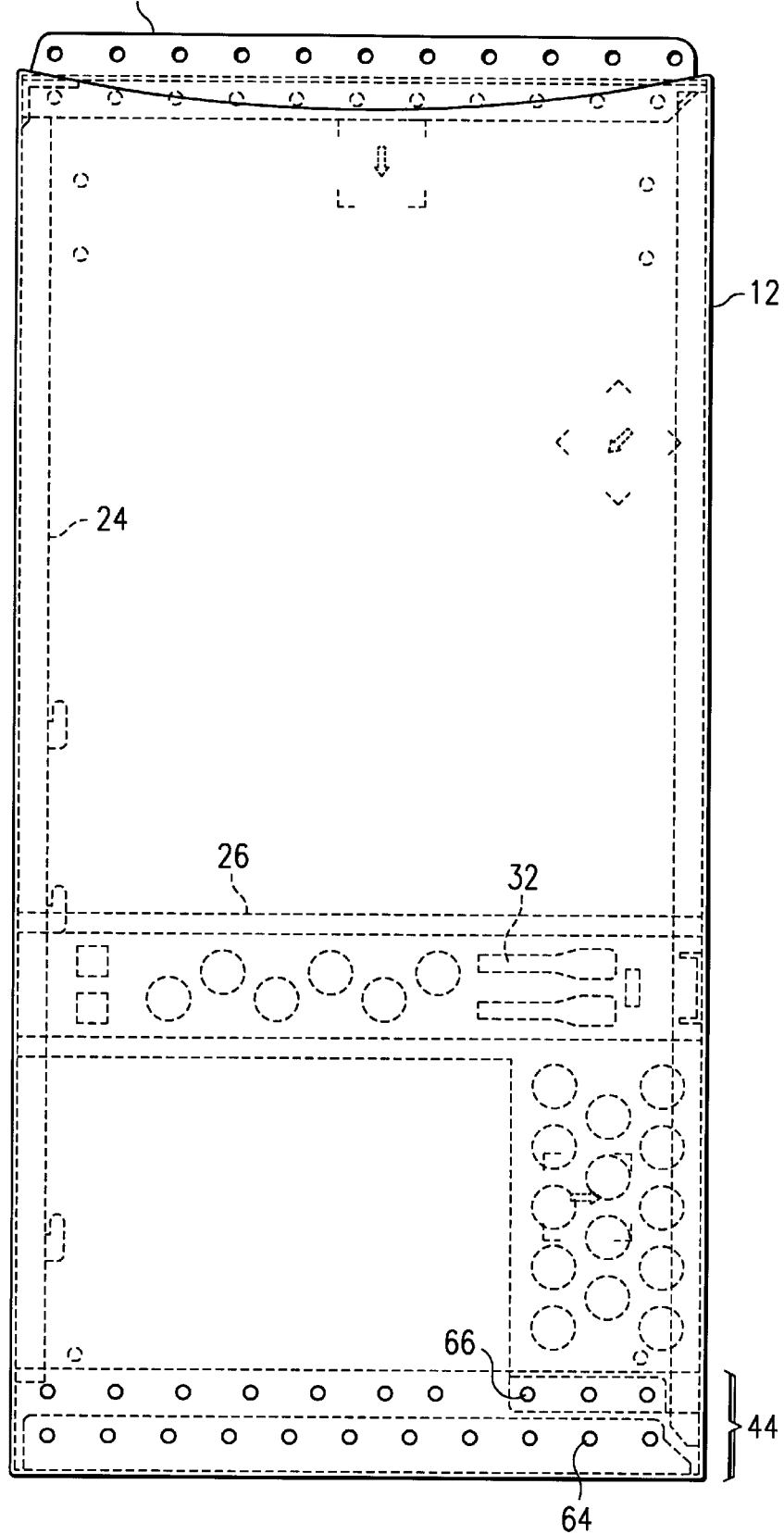
FIG. 10 a top view of the computer enclosure of FIG. 1 showing internal structural support members with hidden lines.

FIG. 8 is an enlarged view of area 8 circled in FIG. 7. Clearance hole 64 of back end panel 16 engages a rivet formed on hem portion 44 of panel 12. Clearance hole 66 of bracket 26 engages a different rivet formed on hem portion 44 of panel 12. FIG. 9 illustrates the same assembly from the side, with internal structural support members shown with hidden lines. FIG. 10 illustrates the same assembly from the top with internal structural support members shown with hidden lines.

While the invention has been described herein with reference to a particular embodiment, the illustrated embodiment has been shown by way of example and not by way of limitation. Persons having ordinary skill in the art and having reference to this specification will appreciate that various alternative embodiments may be created while remaining within the scope of the following claims and their equivalents.

What is claimed is:

1. A computer enclosure having cosmetic sides, comprising:

a sheet metal panel having a substantially planar first surface forming a first one of the cosmetic sides of the computer enclosure, and having a first folded hem along one edge of the first surface and the first folded hem facing the inside of the computer enclosure, the plane of the first folded hem substantially parallel with the plane of the first surface;

at least one rivet integrally formed in the first folded hem said at least one rivet having a longitudinal portion and a swaged end extending from the first folded hem toward the inside of the computer enclosure; and a secured piece fastened to the sheet metal panel at the first folded hem;

wherein the secured piece has at least one clearance hole formed therein for engaging the first rivet; and wherein the longitudinal portion of the first rivet passes through the clearance hole in the secured piece and the swaged end of the first rivet holds the secured piece in place against the first folded hem.

2. The computer enclosure of claim 1, wherein the secured piece comprises a front end panel of the computer enclosure.

3. The computer enclosure of claim 1, wherein the secured piece comprises a back end panel of the computer enclosure.

4. The computer enclosure of claim 1, wherein the secured piece comprises a first structural support member disposed on the inside of the computer enclosure.

5. The computer enclosure of claim 4, wherein the first structural support member comprises a longitudinal strut oriented substantially parallel to the first cosmetic side of the computer enclosure.

6. The computer enclosure of claim 5, wherein the sheet metal panel has a substantially planar second surface forming a second one of the cosmetic sides of the computer enclosure, and has a second folded hem along one edge of the second surface and the second folded hem facing the inside of the computer enclosure, the plane of the second folded hem substantially parallel with the plane of the second surface, and the plane of the second surface substantially orthogonal to the plane of the first surface;

wherein at least one rivet is integrally formed in the second folded hem said at least one rivet in said second hem having a longitudinal portion and a swaged end extending from said second folded hem toward the inside of the computer enclosure; and further comprising a second structural support member disposed on the inside of the computer enclosure and fastened to the sheet metal panel at the second folded hem;

wherein the second structural support member has at least one clearance hole formed therein for engaging the second rivet; and wherein the longitudinal portion of the second rivet passes through the clearance hole in the second structural support member and the swaged end of the second rivet holds the second structural support member in place against the second folded hem.

7. The computer enclosure of claim 6, wherein the second structural support member comprises a bracket oriented substantially parallel to the second cosmetic side of the computer enclosure.

8. The computer enclosure of claim 7, wherein the bracket has first and second ends;

wherein the first end is fastened to the longitudinal strut; and wherein the second end is fastened to the sheet metal panel at the second folded hem.

9. The computer enclosure of claim 8, wherein the longitudinal strut is adapted to engage a system board mounting tray; and wherein the bracket is adapted to engage a card guide for input/output boards that are connected to the system board.

* * * * *